US012792601B2

(12) United States Patent
Laurence et al.

(10) Patent No.: US 12,792,601 B2
(45) Date of Patent: Nov. 10, 2026

(54) RESPONSE SYSTEM AND RESPONSE METHOD

(71) Applicant: Hitachi, Ltd., Tokyo (JP)

(72) Inventors: Alexander Adam Laurence, Tokyo (JP); Yuya Isoda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 19/309,890

(22) Filed: Aug. 26, 2025

(65) Prior Publication Data

US 2026/0211878 A1 Jul. 23, 2026

(30) Foreign Application Priority Data

Jan. 20, 2025 (JP) ................................. 2025-007852

(51) Int. Cl.
*G06F 16/2452* (2019.01)
*G06F 16/2457* (2019.01)
*G06F 16/901* (2019.01)

(52) U.S. Cl.
CPC .. *G06F 16/24522* (2019.01); *G06F 16/24578* (2019.01); *G06F 16/9024* (2019.01)

(58) Field of Classification Search
CPC ........... G06F 16/24522; G06F 16/9024; G06F 16/24578
USPC .......................................................... 707/723
See application file for complete search history.

(56) References Cited

U.S. PATENT DOCUMENTS 9,280,908 B2 3/2016 Isensee et al.
11,100,122 B2 * 8/2021 Carroll .............. G06F 16/24578
11,983,208 B2 * 5/2024 Osuala ................ G06F 16/3347
12,314,347 B2 * 5/2025 Krishnan .......... G06F 16/24556
12,639,341 B2 * 5/2026 Pena Pena ............ G06F 16/288
2023/0031591 A1 * 2/2023 Remis ................. G06F 16/9038
2024/0296309 A1 * 9/2024 Mitra ....................... G06N 3/08
(Continued)

FOREIGN PATENT DOCUMENTS

WO 2023242540 A1 12/2023
WO 2024015321 A1 1/2024

OTHER PUBLICATIONS

Abdali, Sara, et al., "Vec2Node: Self-Training with Tensor Augmentation for Text Classification with Few Labels", ECML, PKDD 2022, LNAI 13714, Springer, Cham., Mar. 17, 2023, pp. 571-587.*
(Continued)

*Primary Examiner* — Robert Stevens
(74) *Attorney, Agent, or Firm* — Volpe Koenig

(57) ABSTRACT

A processor executes a two-stage ranking process, and the processor executes tensor search to understand semantic of the tensor embeddings based on a predetermined similarity and obtain top k (k is a natural number) nodes and edges from a tensor database, based on a vector query, and graph search to search a graph database to check relationships between the obtained edges and nodes and other entities and obtain a context from the relationships, and combines a result of the tensor search and a result of the graph search by calculating a composite score based on tensor scores indicating semantics of top k nodes and edges obtained from the tensor database and graph scores indicating relationships obtained from the graph database, creates a prompt from the top k nodes, and generates an answer using a large-scale language model in response to the prompt.

15 Claims, 17 Drawing Sheets

(56) References Cited

U.S. PATENT DOCUMENTS

| | | | | |
|---|---|---|---|---|
| 2025/0061077 | A1* | 2/2025 | Jung | G06F 9/4881 |
| 2025/0111204 | A1* | 4/2025 | Eggert | G06F 16/3347 |

OTHER PUBLICATIONS

Li, Guanghua, et al., "TenGraph: A Tensor-Based Graph Query Engine", Proc. of the VLDB Endowment, vol. 17, No. 13, Sep. 1, 2024, pp. 4571-375.*

* cited by examiner

FIG. 4

273B

| CHUNK ID | TITLE | SOURCE | PUBLICATION DATE | SECTION TEXT | CHUNK TEXT | START INDEX | END INDEX |
|---|---|---|---|---|---|---|---|
| 1 | "TROUBLESHOOTING GUIDE" | "TECH SUPPORT Inc." | 2023-09-15 | "CHAPTER 1 NETWORK ISSUES ..." | "COMMON NETWORK ISSUES ..." | 0 | 150 |
| 2 | "ERROR CODE MANUAL" | "DevOps TEAM" | 2023-10-01 | "ERROR 404: PAGE NOT FOUND ..." | "THIS ERROR OCCURS IN FOLLOWING CASE ..." | 200 | 350 |
| 3 | "SYSTEM OPTIMIZATION" | "IT DEPARTMENT" | 2023-10-15 | "DATABASE PERFORMANCE IMPROVEMENT" | "TO OPTIMIZE DATABASE QUERIES ..." | 0 | 200 |
| ... | ... | ... | ... | ... | ... | ... | ... |
| 100 | "SECURITY BEST PRACTICE" | "CYBERSECURITY TEAM" | 2023-12-31 | "CHAPTER 10 ENCRYPTION ..." | "END-TO-END ENCRYPTION IS ..." | 1800 | 2000 |

FIG. 5

274A

| TENSOR ID | DOCUMENT ID | CHUNK ID | CHUNK TENSOR | TENSOR FORMAT |
|---|---|---|---|---|
| 1 | 1 | 1 | [0.1, 0.3, -0.2, ...] | [1, 768] |
| 2 | 1 | 2 | [-0.4, 0.2, 0.5, ...] | [1, 768] |
| 3 | 2 | 1 | [0.3, -0.1, 0.4, ...] | [1, 768] |
| ... | ... | ... | ... | ... |
| 1000 | 100 | 3 | [0.2, 0.6, -0.3, ...] | [1, 768] |

FIG. 6

276A

| QUERY ID | QUERY |
|---|---|
| 301 | "HOW TO FIX NETWORK TIMEOUT?" |
| 302 | "WHAT CAUSES ERROR 404?" |
| 303 | "BEST PRACTICE FOR DATABASE OPTIMIZATION" |
| ... | ... |
| 1000 | "IMPORTANCE OF END-TO-END ENCRYPTION" |

FIG. 7

276B

| QUERY ID | VECTOR QUERY |
|---|---|
| 301 | [0.3, -0.1, 0.6, 0.2, ..., -0.4] |
| 302 | [-0.2, 0.5, 0.1, -0.3, ..., 0.7] |
| 303 | [0.4, 0.2, -0.5, 0.8, ..., 0.1] |
| ... | ... |
| 1000 | [0.6, -0.3, 0.2, 0.5, ..., -0.1] |

FIG. 8

276C

| PROMPT ID | PROMPT |
|---|---|
| 301 | IN "SEGMENT 1.4" OF DOCUMENT "DOCUMENT 1", IT IS EXPLAINED AS "...", BUT I WANT TO KNOW HOW IT IS EXPLAINED. |
| 302 | ... |
| 303 | ... |
| ... | ... |
| 1000 | ... |

FIG. 10

278A

| QUERY ID | TENSOR ID | SCORE |
|---|---|---|
| 1 | 1 | 0.85 |
| 1 | 5 | 0.72 |
| 2 | 10 | 0.93 |
| ... | ... | ... |
| 1000 | 995 | 0.88 |

FIG. 11

278B

| TENSOR ID | NODE ID | SCORE |
|---|---|---|
| 1 | 1 | 0.78 |
| 5 | 3 | 0.65 |
| 10 | 7 | 0.89 |
| ... | ... | ... |
| 995 | 100 | 0.92 |

FIG. 12

278C

| QUERY ID | TENSOR ID | COMPOSITE SCORE |
|---|---|---|
| 1 | 1 | 0.815 |
| 2 | 5 | 0.91 |
| 3 | 10 | 0.79 |
| ... | ... | ... |
| 1000 | 995 | 0.90 |

FIG. 13

279A

| ANSWER ID | ANSWER TEXT | FEEDBACK | ANNOTATION LABEL |
|---|---|---|---|
| 1 | "TO FIX SLOW INTERNET, FIRST ..." | "THANKS FOR YOUR HELP" | "GOOD ANSWER" |
| 2 | "SERVER BACKUP IS ..." | "MISS SOME STEPS" | "BAD ANSWER" |
| 3 | "CLOUD MIGRATION INCLUDES FOLLOWINGS ..." | "VERY COMPREHENSIVE" | "GOOD ANSWER" |
| ... | ... | ... | ... |
| 1000 | "AI INTEGRATION BENEFITS SUPPORT ..." | "NEED MORE SPECIFICS" | "BAD ANSWER" |

FIG. 14

275A

| PARAMETER ID | WEIGHT ADJUSTMENT SCORE | DATE |
|---|---|---|
| 1 | 1.05 | 2024-09-01 |
| 2 | 0.98 | 2024-09-02 |
| 3 | 1.02 | 2024-09-03 |
| ... | ... | ... |
| 100 | 1.01 | 2024-09-11 |

FIG. 15

280A

| TRUE VALUE ID | ANSWER | FEEDBACK | ANNOTATION LABEL |
|---|---|---|---|
| 1 | "CAUSE OF NETWORK LATENCY ..." | "VERY FRIENDLY DESCRIPTION" | "GOOD ANSWER" |
| 2 | "TO PERFORM SERVER BACKUPS ..." | "CLEAR AND CONCISE STEP" | "GOOD ANSWER" |
| 3 | "CLOUD MIGRATION REQUIRES CAREFUL PLANNING ..." | "GOOD OVERVIEW, BUT LACKING DETAILS" | "BAD ANSWER" |
| ... | ... | ... | ... |
| 1000 | "AI CHATBOT CAN IMPROVE CUSTOMER SUPPORT ..." | "COVERED ALL IMPORTANT POINTS" | "GOOD ANSWER" |

280B

280B

RESPONSE SYSTEM AND RESPONSE METHOD

BACKGROUND OF THE INVENTION

1. Field of the Invention

The present invention relates to a response system and a response method, and is suitable for application to, for example, a response system related to a technique of answering a customer using a computer.

2. Description of Related Art

In recent years, customer service systems, for example, have been developed as response systems that provide answers to customers. The customer service systems have a function for responding using Artificial Intelligence (AI) or so-called chatbots. Many of such response systems automatically provide answers to inquiries (see WO2024/015321, U.S. Pat. No. 9,280,908B, and WO2023/242540).

However, the technologies disclosed in WO2024/015321, U.S. Pat. No. 9,280,908B, and WO2023/242540 were unable to achieve high accuracy in answers to inquiries.

SUMMARY OF THE INVENTION

The present invention has been made in consideration of the above points, and proposes a response system that can improve the accuracy of answers.

According to the present invention, there is provided a response system including a processor that executes a predetermined document process on an input document, executes an information search process on a result of the predetermined document process, and responds according to a result of the information search process, in which the processor analyzes the document received as input, divides the document into chunks that are smaller sections, generates a tensor embedding from each of the chunks, and identifies from contents of the document, a relationship between at least one node corresponding to the chunk and edges representing relationships between the nodes, stores the tensor embeddings in a tensor database and stores the relationships between the nodes and the edges in a graph database, and generates a corresponding vector query using a model of the tensor embeddings in response to a query received from outside, thereby executing a two-stage ranking process, and further, the processor executes tensor search to understand semantic of the tensor embeddings based on a predetermined similarity and obtain top k (k is a natural number) nodes and edges from the tensor database, based on the vector query, and graph search to search the graph database to check relationships between the obtained edges and nodes and other entities and obtain a context from the relationships, and combines a result of the tensor search and a result of the graph search by calculating a composite score based on tensor scores indicating semantics of the top k nodes and edges obtained from the tensor database and graph scores indicating the relationships obtained from the graph database, creates a prompt from the top k nodes, and generates an answer using a large-scale language model in response to the prompt.

According to the present invention, the accuracy of answers can be improved.

BRIEF DESCRIPTION OF THE DRAWINGS

FIG. 4 is a diagram showing an example of a configuration of a document management table of a document database shown in FIG. 3;

FIG. 5 is a diagram showing an example of a configuration of a document tensor of a tensor database shown in FIG. 3;

FIG. 6 is a diagram showing an example of a configuration of a query of a query database;

FIG. 7 is a diagram showing an example of a configuration of a vector query management table of the query database;

FIG. 8 is a diagram showing an example of a configuration of a prompt management table of the query database;

FIG. 10 is a diagram showing an example of a configuration of a tensor score management table of a score database shown in FIG. 3;

FIG. 11 is a diagram showing an example of a configuration of a graph score management table of the score database shown in FIG. 3;

FIG. 12 is a diagram showing an example of a configuration of a composite score management table of the score database shown in FIG. 3;

FIG. 13 is a diagram showing an example of a configuration of an answer management table of a answer database;

FIG. 14 is a diagram showing an example of a configuration of a system parameter management table in a system parameter database;

FIG. 15 is a diagram showing an example of a configuration of a true value management table in a true value database;

DESCRIPTION OF EMBODIMENTS

The present embodiment of the present invention will be described in detail below with reference to the drawings.

Figure 1:
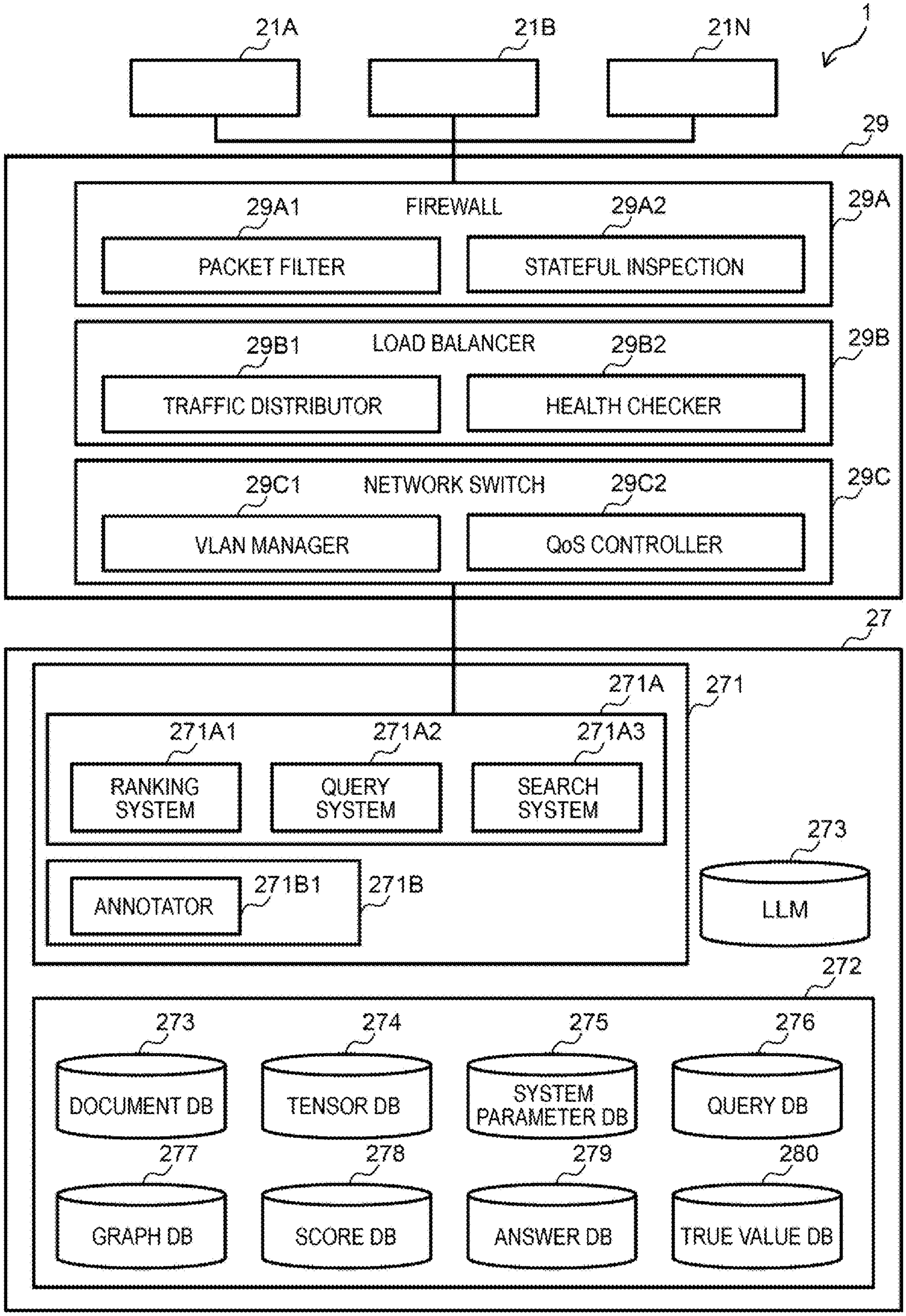
FIG. 1 is a system configuration diagram showing an example of a configuration of a customer service system including a server system as an example of a response system according to the present embodiment.

FIG. 1 is a system configuration diagram showing an example of the configuration of a customer service system 100 including a server system 27 as an example of a response system according to the present embodiment. The customer service system 100 includes the server system 27, a network 29, and a first client device 21A to an Nth client device 21N. Note that N is a natural number. The server system 27 and the first client device 21A to the Nth client device 21N are connected to each other via the network 29, and can exchange data, etc.

The first client device 21A to the Nth client device 21N each send document data (hereinafter abbreviated as "document") to the server system 27, and request an answer to the document from the server system 27.

The network 29 includes a firewall 29A, a load balancer 29B, and a network switch 29C. The firewall 29A includes a packet filter 291A1 and a stateful inspection 291A2. The load balancer 29B includes a traffic distributor 29B1 and a health checker 29B2. The network switch 29C includes a virtual local area network (VLAN) manager 29C1 and a quality of service (QoS) controller 29C2.

The server system 27 includes an application server 271, a database server (hereinafter referred to as "DB server") 272, and a large-scale language model (hereinafter also abbreviated as "LLM") 273.

The application server 271 includes a first application server 271A and a second application server 271B. The first application server 271A includes a ranking system 271A1 that performs ranking, which will be described later, a query system 271A2 that processes queries, which will be described later, and a search system 271A3 that performs tensor search and graph search, which will be described later. The second application server 271B includes an annotator 271B1 that creates annotations used in annotation labels, which will be described later. The term "tensor" refers to a numerical representation of the entire document by creating a multidimensional matrix with numerical values as elements, when dividing a document into sections (corresponding to chunks in the present embodiment) such as words and characters (hereinafter also referred to as "words, etc.") in language processing and assigning a numerical value (e.g., ID: IDentifier) to each word, etc. On the other hand, the term "graph" refers to a data structure that is configured with nodes and edges obtained from a plurality of chunks obtained by dividing a plurality of words, etc. that configure sentences included in a document as sections. Here, the term "tensor" refers to a multidimensional array as described above, and is used in language processing to express words, etc., by quantifying the words. On the other hand, a graph is configured with nodes and edges as described above, and is, for example, a non-numerical data structure.

In the present embodiment, the application server 271 is configured to include the first application server 271A and the second application server 271B, but the present invention is not limited to the above, and the application server 271 may be configured such that the first application server 271A and the second application server 271B are integrated.

These systems of the application server 271 may not have only independent configurations, but may also have each function implemented by a single processor. The following description of this embodiment will be given assuming the latter configuration.

On the other hand, the database server 272 includes a document database (hereinafter referred to as "document DB") 273, a tensor database (hereinafter referred to as "tensor DB") 274, a system parameter database (hereinafter referred to as "system parameter DB") 275, a query database (hereinafter referred to as "query DB") 276, a graph database (hereinafter referred to as "graph DB") 277, a score database (hereinafter referred to as "score DB") 278, an answer database (hereinafter referred to as "answer DB") 279, and a true value database (hereinafter referred to as "true value DB") 280. The details of the tensor DB 274, the system parameter DB 275, the query DB 276, the graph DB 277, the score DB 278, the answer DB 279, and the true value DB 280 will be described later.

Figure 2:
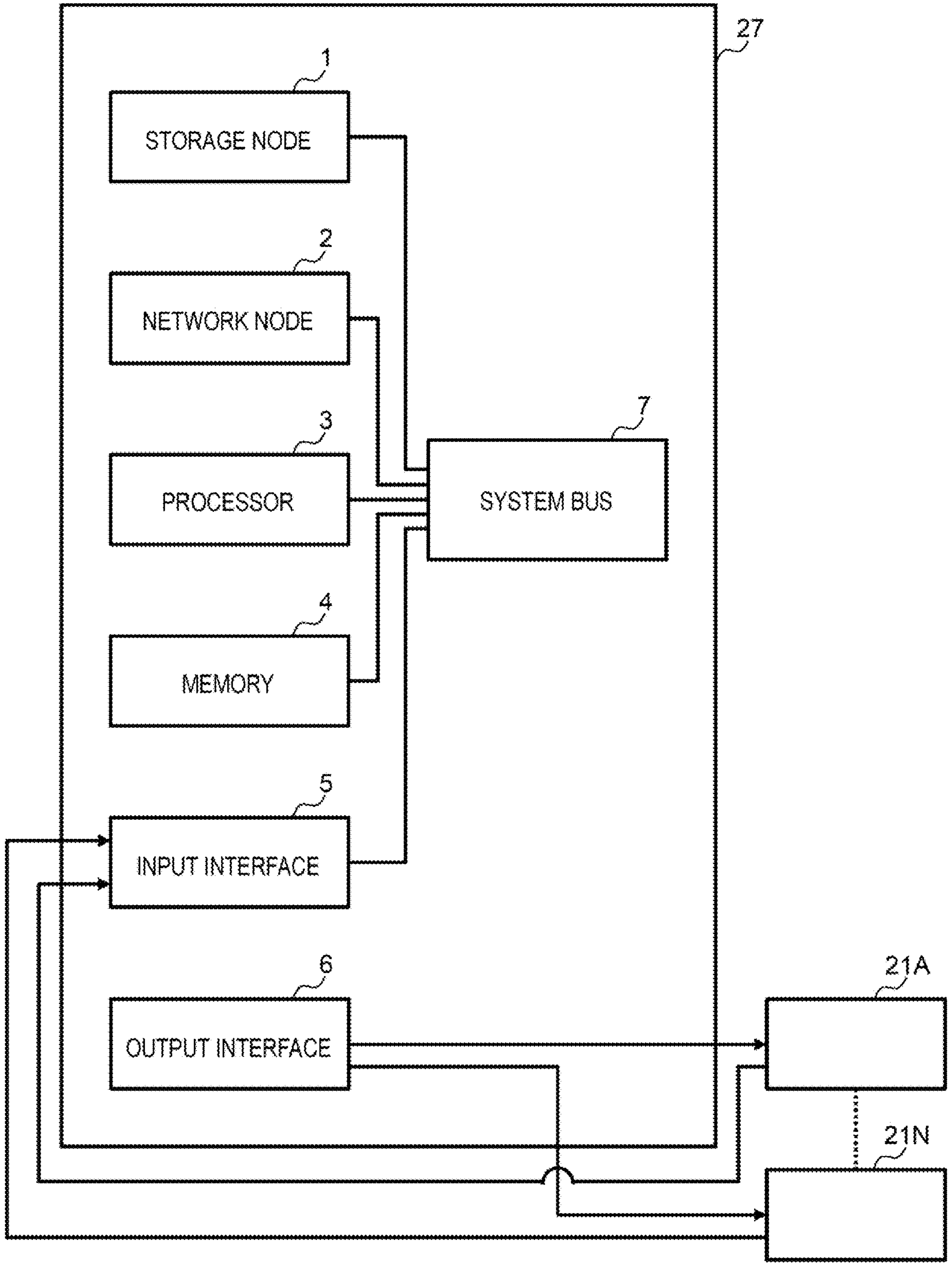
FIG. 2 is a system configuration diagram showing an example of a hardware structure of the server system shown in FIG. 1.

FIG. 2 is a system configuration diagram showing an example of the hardware structure of the server system 27 shown in FIG. 1. The server system 27 is, for example, a computer. The server system 27 includes a storage node 1, a network node 2, a processor 3 such as a central processing unit (CPU), a memory 4, an input interface 5, an output interface 6, and a system bus 7.

The storage node 1, the network node 2, the processor 3, the memory 4, the input interface 5, and the output interface 6 are connected to each other via the system bus 7, and can exchange data, etc.

The first client device 21A to the Nth client device 21N input, for example, a document related to a predetermined request as input to the server system 27 via the input interface 5. The first client device 21A to the Nth client device 21N output, for example, a document corresponding to the predetermined request as output from the server system 27 via the output interface 6.

Figure 3:
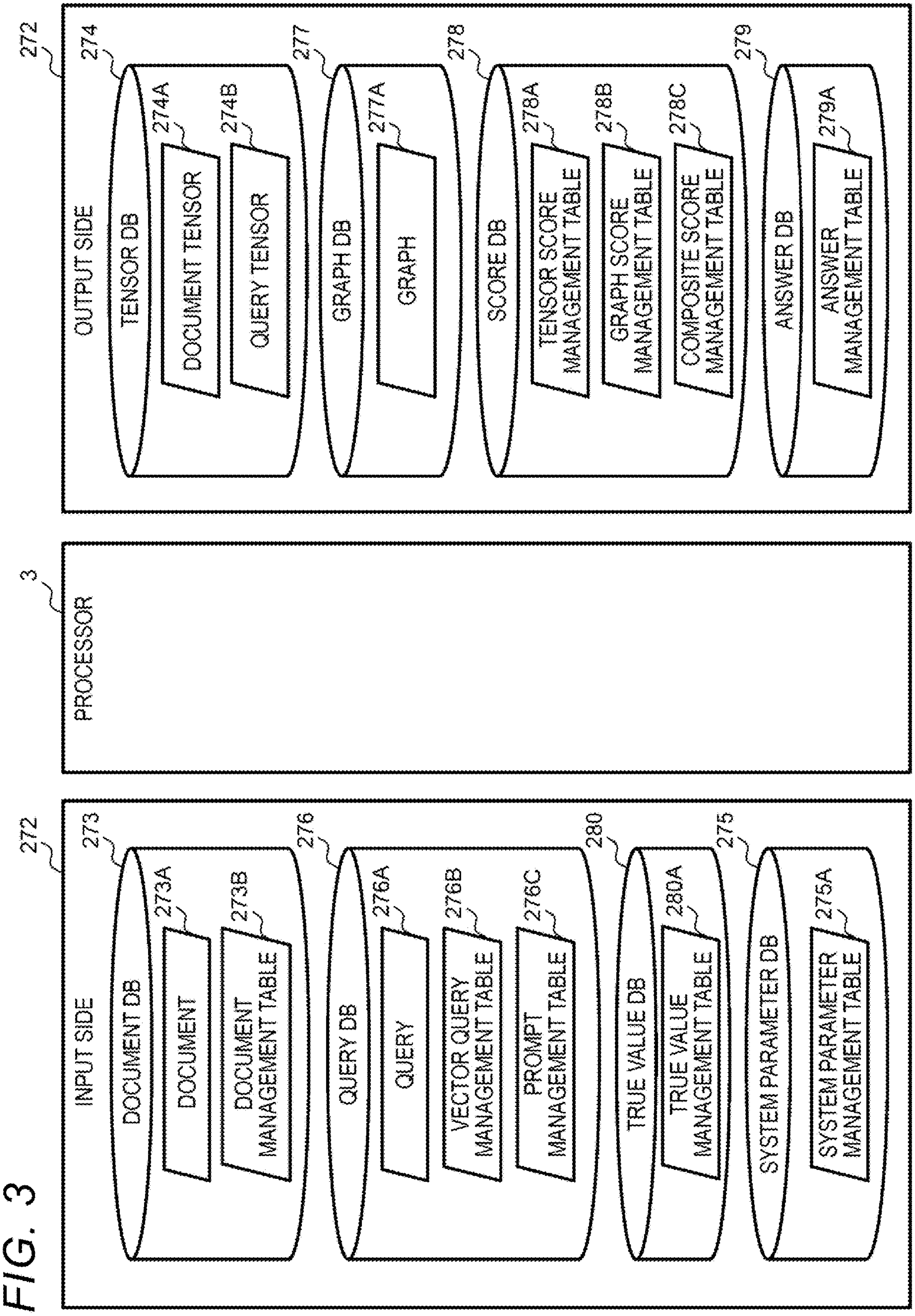
FIG. 3 is a block diagram of the server system shown in FIG. 1, in which a database server is divided into an input side and an output side, with a processor at the center.

FIG. 3 is a block diagram of the server system 27 shown in FIG. 1, in which the database server 272 is divided into an input side and an output side, with the processor 3 at the center.

In the database server 272, the input side includes the document DB 273, the query DB 276, the true value DB 280, and the system parameter DB 275. The document DB 273 stores documents 273A. The query DB 276 includes query 276A, a vector query management table 276B, and a prompt management table 276C. The true value DB 280 includes a true value management table 280A that manages true values. The system parameter DB 275 includes a system parameter management table 275A that manages system parameters.

In the database server 272, the output side includes the tensor DB 274, the graph DB 277, the score DB 278, and the answer DB 279. The tensor DB 274 stores document tensors 274A and query tensors 274B. The document tensor 274A corresponds to, for example, tensor embeddings, which will be described later.

As described below, the processor 3 generates tensor embeddings from each chunk. The tensor embeddings represent the meaning of words, etc. as numerical vectors, and are used, for example, to calculate the similarity between a plurality of words, etc. or capture changes in the meaning of words, etc. according to the context. The tensor embeddings can calculate the similarity between desired objects that configure a document. The use of tensor embeddings makes it possible to express structures that take into account not only the words themselves, but also the order and grammatical structure of a plurality of words, etc. The reason why tensor embeddings are necessary in language processing is that in natural language, the meaning of words changes significantly depending on the context, and it is necessary to consider expressions that take the context into account. The similarity (q, d) (hereinafter sometimes simply referred to as "score") between a query vector q and each document chunk vector d is calculated using the following calculation formula. This similarity (q, d) corresponds to, for example, KeywordScore, which will be described later.

$$\text{Similarity } (q, d) = (q * d)/(|q| * |d|)$$

Document tensor 274A manages, for each tensor IDentifier (ID) for identifying a plurality of tensors from each other, a document IDentifier (ID) for identifying a plurality of documents from each other, a chunk ID for identifying a plurality of chunks that configure a document, chunk tensors, and tensor formats. The chunk tensor is, for example, a multidimensional array, i.e., a table with numbers arranged in a regular order, used to represent each chunk. The tensor format may be, for example, a scalar (zero-dimensional tensor) represented by a single number, a vector (one-dimensional tensor) represented by a string of numbers, a matrix (two-dimensional tensor) represented by a table of numbers, or a set of numbers in the shape of a cube (three-dimensional tensor), corresponding to chunk. On the other hand, the query tensor 274B is, for example, a multidimensional array, i.e., a table with numbers arranged in a regular order, used to represent each query. The query format of the query tensor 274B may be, for example, a scalar (zero-dimensional tensor) represented by a single number, a vector (one-dimensional tensor) represented by a string of numbers, a matrix (two-dimensional tensor) represented by a table of numbers, or a set of numbers in the shape of a cube (three-dimensional tensor), corresponding to each query.

The graph DB 277 stores, for example, a graph 277A showing the relationship between nodes and edges extracted in response to a query. The score DB 278 includes a tensor score management table 278A, a graph score management table 278B, and a composite score management table 278C. The score DB 278 stores scores, which will be described later. The answer DB 279 stores an answer management table 279A that manages generated answers.

FIG. 4 is a diagram showing an example of the configuration of the document management table 273B of the document DB 273 shown in FIG. 3. The document management table 273B manages the title, source, publication date, section text, chunk text, start index, and end index for each chunk IDentifier (ID) for identifying a plurality of chunks from each other. The section text indicates each word, etc. that configures a document. The chunk text indicates words, etc. that have been divided into chunks. The start index and end index indicate the start position and end position of the chunk text in the document, respectively.

FIG. 5 is a diagram showing an example of the configuration of the document tensor 274A in the tensor DB 274 shown in FIG. 3. The document tensor 274A manages tensor IDs, document IDs, chunk IDs, chunk tensors, and tensor formats. Note that the query tensor 274B has already been described, so its description is omitted.

FIG. 6 is a diagram showing an example of the configuration of query 276A in the query DB 276. The query 276A manages query for each query ID. The query 276A include an instruction for executing a process in accordance with a desired request. A query is created in accordance with a desired request.

FIG. 7 is a diagram showing an example of the configuration of the vector query management table 276B in the query DB 276. The vector query management table 276B manages a vector query for each query ID. Here, the vector query refers to a query for converting a document into a numerical vector, and for searching and calculating the similarity based on the numerical vector, in natural language processing. In the present embodiment, the search includes tensor search and graph search.

FIG. 8 is a diagram showing an example of the configuration of the prompt management table 276C of the query DB 276. The prompt management table 276C manages a prompt for each prompt IDentifier (ID). The prompts are used to generate an answer using a large-scale language model, as described below.

Figure 9:
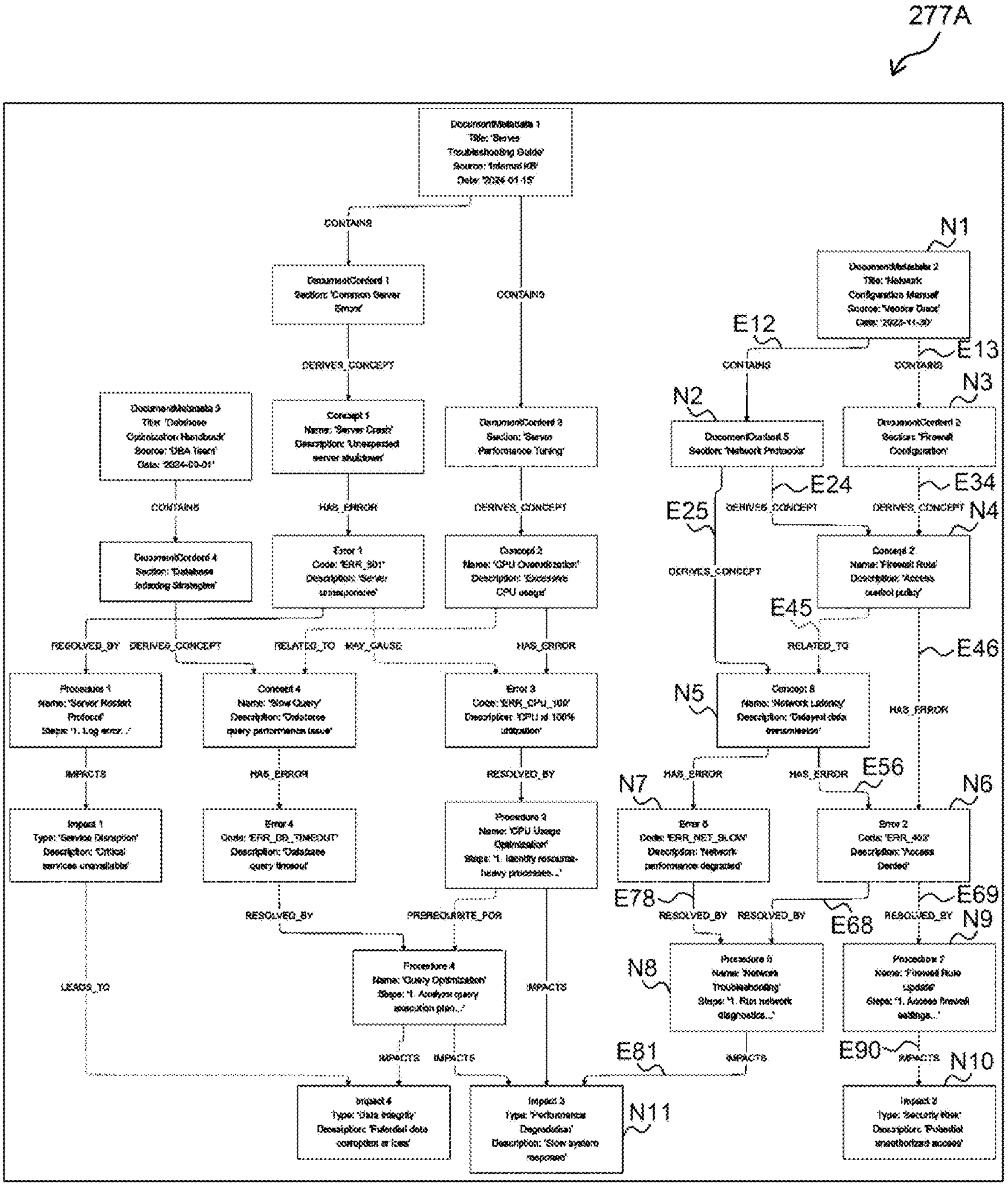
FIG. 9 is a diagram showing an example of a configuration of a graph of a graph database.

FIG. 9 is a diagram showing an example of the configuration of a graph 177A of the graph DB 277. The graph 177A manages each of nodes N1 to N11 and edges showing the relationship between the nodes N1 to N11.

For example, nodes N1 and N2 are related to each other by edge E12 called "CONTAINS", indicating that the node N1 includes node N2. For example, nodes N3 and N4 are related to each other by edge E34 called "DERIVES_CONCEPT", indicating that the node N3 is derived from the node N4. Note that "CONCEPT" refers to an abstract concept or subject that appears in a document, and is a part of a node. For example, nodes N4 and N6 are related to each other by edge E46 called "HAS_ERROR", indicating that there is an error in the relationship between the nodes N4 and N6. For example, nodes N6 and N9 are related to each other by edge E69 called "RESOLVE_BY", indicating that the node N6 is resolved by the node N9. For example, nodes N9 and N10 are related to each other by edge E90 called "IMPACTS", indicating that the node N9 impacts the node N10.

FIG. 10 is a diagram showing an example of the configuration of the tensor score management table 278A of the score DB 278 shown in FIG. 3. The tensor score management table 278A manages the tensor ID and score for each of query IDs for identifying a plurality of queries from each other. The score here refers to the tensor score, which will be described later.

FIG. 11 is a diagram showing an example of the configuration of the graph score management table 278B of the score DB 278 shown in FIG. 3. The graph score management table 278B manages, for each tensor ID, a node IDentifier (ID) for identifying a node from a plurality of nodes and a score. The score here refers to the graph score, which will be described later.

FIG. 12 is a diagram showing an example of the configuration of the composite score management table 278C of the score DB 278 shown in FIG. 3. The composite score management table 278C manages the tensor ID and composite score for each query ID. The composite score is a final score (FinalScore) calculated from the tensor score (TensorScore) and the graph score (GraphScore) using a weighted sum of the individual scores according to the following formula: In the present embodiment, performing such a calculation may also be expressed as weighting the score.

$$FinalScore = w1 \times TensorScore + w2 \times GraphScore + w3 \times KeywordScore$$

Here, coefficients w1, w2, and w3 are configurable weights that sum to 1. These scores are stored in the score DB 278.

In the present embodiment, the composite score is obtained by adding the tensor score and the graph score and dividing the add result by 2, as an example. The composite score may be calculated by other methods.

FIG. 13 is a diagram showing an example of the configuration of the answer management table 279A in the answer DB 279. The answer management table 279A manages answer texts, feedback, and annotation labels, which represent the character strings of answers, for each answer ID for distinguishing between a plurality of answers. The annotation label is, for example, a label showing an annotation according to the result of determining whether the answer represented by the answer text is a "good answer" or a "bad answer" according to the feedback. Here, the feedback may be automatically created by the processor 3 of the server system 27, or may be created by an expert, for example.

FIG. 14 is a diagram showing an example of the configuration of a system parameter management table 275A in the system parameter DB 275. The system parameter management table 275A manages a weight adjustment score and a date for each parameter IDentifier (ID). The parameter ID is identification information for identifying a plurality of parameters that can serve as required values on the system when the server system 27 operates. The weight adjustment score is a score used when adjusting the weight described below. The date indicates, for example, the date on which the weight is to be adjusted.

FIG. 15 is a diagram showing an example of the configuration of the true value management table 280A of the true value DB 280. The true value management table 280A manages answers, feedback, and annotation labels as true values for each true value IDentifier (ID). The true value ID is identification information for identifying a plurality of true values from each other.

Next, the functions of the server system 27 according to the present embodiment will be described in detail. Note that in the following description, the above-mentioned reference signs may be omitted.

The server system 27 of the present embodiment is a response system including a processor 3 that executes a predetermined document process on an input document, executes an information search process on a result of the predetermined document process, and responds according to a result of the information search process. In the server system 27, the processor 3 analyzes the document received as input and divides the document into chunks, which are smaller sections. Note that the document process corresponds to FIG. 16, which will be described later, and the information search process corresponds to FIG. 17, which will be described later.

The processor 3 of the server system 27 generates the tensor embeddings from each divided chunk, and identifies, from the contents of the document, a relationship between at least one node corresponding to the chunk and an edge representing a relationship between nodes. The processor 3 stores the tensor embeddings in the tensor DB 274, which is an example of a tensor database, and stores the relationship between nodes and edges, that is, the graph, in the graph DB 277, which is an example of a graph database. The processor 3 generates a corresponding vector query using a model of the tensor embeddings in response to a query received from outside, thereby executes a two-stage ranking process.

Furthermore, the processor 3 performs tensor search to understand semantic of the tensor embeddings based on a predetermined similarity and obtain top k (k is a natural number) nodes and edges from the tensor DB 274 based on the vector query, and graph search to search the graph DB 277 to check the relationships between the obtained edges and nodes and other entities, such as other nodes, and obtain a context from the relationships. The processor 3 calculates a composite score based on the tensor scores indicating the semantics of the top k (k is a natural number) nodes and edges obtained from the tensor DB 274 and the graph scores indicating the relationships obtained from the graph DB 277 to combine the result of the tensor search and the result of the graph search, creates a prompt from the top k nodes, and generates an answer using the LLM 273 as an example of a large-scale language model in response to the prompt.

The processor 3 determines whether the answer generated using the LLM 273 satisfies a predetermined metric, and when the metric is not satisfied, the processor 3 collects feedback on the answer.

In the present embodiment, the feedback is collected as contents reflecting the result of examining the validity of the answer generated using the LLM 273, for example, by Artificial Intelligence (AI) or the user. The result of examining the validity of the generated answer is provided as an input to a learning system trained with true values consisting of at least one of the answer generated using the LLM 273, complement by the user, and annotation labels described below.

The processor 3 uses a predetermined learning system to predict annotation labels for answers generated using the LLM 273. The annotation labels are selected from a set of predefined annotation labels (for example, "good answer", "bad answer").

The processor 3 adjusts the ranking of the nodes and edges by applying weights to the scores that increases if the answer is good and decreases if the answer is bad, based on the predicted annotation labels.

When generating each chunk from the document, the processor 3 uses named entity recognition (NER) and pattern matching techniques to identify a plurality of entities from each chunk, which is a section of the document, generates nodes and edges representing relationships between the identified plurality of entities, and stores the nodes and edges in the graph DB 277, for example, for structured queries.

In response to the query, the processor 3 searches the tensor DB 274 for tensor embeddings, identifies related nodes by analyzing relationships between the retrieved tensor embeddings and other entities stored in the graph DB 277, combines the relationship with the context from the graph DB 277, and again adjusts the composite score.

The processor 3 uses a learning system for annotating the answers generated using the LLM 273 to perform training with true values including past answers generated using the LLM 273, predetermined feedback, or annotation labels assigned to classify the quality of answers.

The processor 3 reflects the adjusted composite score in queries that will be generated in the future. In other words, the processor 3 uses the adjusted composite score to make queries to be generated thereafter more accurate.

The processor 3 uses nodes or edges that have been previously labeled as good answers as annotation labels with a higher priority in tensor searches and graph searches that are subsequently performed, while using nodes or edges that have been labeled as bad answers as annotation labels with a lower priority in tensor searches and graph searches that are subsequently performed.

The processor 3 calculates weights used for re-ranking using the following equation. The weights here correspond to, for example, scores.

$$Sfinal = Soriginal + (Wlabel \times \text{adjustment coefficient})$$

Sfinal: final adjusted search score

Soriginal: Original Score

Wlabel: weight assigned based on annotation label ("good answer" or "bad answer")

Adjustment coefficient: coefficient by which weight is increased or decreased depending on predicted label.

The processor 3 executes a generation process for generating tensor embeddings and a generation process for generating nodes and edges in parallel. The processor 3 processes data entered in Japanese as the document. The processor 3 executes at least one of tokenization using MeCab, character type normalization, compound word processing using statistical models, dependency analysis using CaboCha, named entity recognition specialized for Japanese, removal of stop words specific to Japanese, and syntactic pattern matching tailored to Japanese structure. MeCab is an open source morphological analysis engine for performing morphological analysis in Japanese. On the other hand, CaboCha is an open source natural language processing tool for performing Japanese dependency analysis.

The processor 3 uses as a predetermined metric for evaluating answers generated using LLM 273, for example, at least one of a mean mutual rank (MMR), a hit rate at the kth order (HR@k), a faithfulness, validity of the answer, contextual usability, and a comprehensive quality score (CQS) calculated as a weighted sum of two or more of these metrics.

The "mean mutual rank (MMR)" is calculated, for example, by the following formula:

$$MRR = (1/|Q|) * \{(1/\text{rank}_1) + (1/\text{rank}_2) + \ldots + (1/\text{rank}_i)\}$$

where i is a natural number between 1 and |Q|. |Q| is the number of queries. $\text{rank}_i$ is the rank of the first context for the i-th query.

The "hit rate at the kth order (HR@k)" is calculated, for example, by the following formula:

$$HR@k = (1/|Q|) * \{1 * (\text{rank}_1 \leq k) + 1 * (\text{rank}_2 \leq k) + \ldots + 1 * (\text{rank}_i \leq k)\}$$

where i is a natural number between 1 and |Q|. |Q| is the number of queries. Here, $C(\text{rank}_i \leq k)$ is a metric function that returns 1 if the rank of the first context is less than or equal to k, and 0 otherwise.

"Faithfulness" can be calculated, for example, by the following formula:

$$\text{Faithfulness} = \text{number of correct facts in the answer}/\text{total number of facts explicitly stated in the answer}$$

The "validity of the answer" can be calculated, for example, by using the cosine similarity between the query vector q and the answer vector a, by the following formula:

$$\text{Validity of the answer} = (q * a)/(|q| * |a|)$$

The "contextual usability" is, for example, the proportion of related contextual information used in an answer, and is calculated by the following formula:

$$\text{Contextual usability} = \text{number of context elements used}/\text{total number of context elements available}$$

"These individual metrics" are combined into a comprehensive quality score (CQS) using a weighted sum.

$$CQS = w1 \times MRR + w2 \times HR@k + w3 \times \text{faithfulness} + w4 \times \text{validity of the answer} + w5 \times \text{contextual usability}$$

where w1, w2, w3, w4, and w5 are configurable weights that sum to 1.

The processor 3 of the server system 27 compares the CQS with a predefined threshold τ. When CQS≥τ, the processor 3 considers that the answer satisfies a predetermined accuracy condition and presents the answer to the user. On the other hand, when CQS<τ, the processor 3 performs additional processes such as query redefining or deeper context analysis to improve the quality of the answer.

The processor 3 may use a forgetting mechanism where importance of past feedback decays exponentially over time. That is, the importance of past feedback decreases exponentially over time:

$$\text{Importance}(t) = e^{-\lambda t}$$

where t is the elapsed time since receiving feedback, and λ is the decay rate.

The score DB 278 stores past scores for chunks of each document. These past scores are used to calculate a time-weighted mean score TimeWeightedScore for each chunk, as follows:

$$TimeWeightedScore = \{(\text{Score}_1 \times W_1) + (\text{Score}_2 \times W_2) + \ldots + (\text{Score}_i \times W_i)\}/\{W_1 + W_2 + \ldots + W_i\}$$

where $\text{Score}_i$ is a score at time i. $W_i$ is a time-based weight calculated using a forgetting mechanism described below.

The above is an example of the configuration of the customer service system 100 including the server system 27 according to the present embodiment. Next, a response method as an example of the operation of the customer service system 100 including the server system 27 will be described.

The response method according to the present embodiment roughly includes two processes: a document process; and an answer process. The document process includes a chunk creation process for creating a plurality of chunks from a document, a tensor creation process for generating a tensor embedding from the created chunks, and a node edge creation process for creating nodes and edges from the created chunks. On the other hand, the answer process includes a vector query creation process, a two-stage ranking process, a top node acquisition process, an answer creation process, and an annotation process, which will be described later. In the answer process, a score adjustment process, which will be described later, may also be executed. A more detailed description will be given below.

Figure 16:
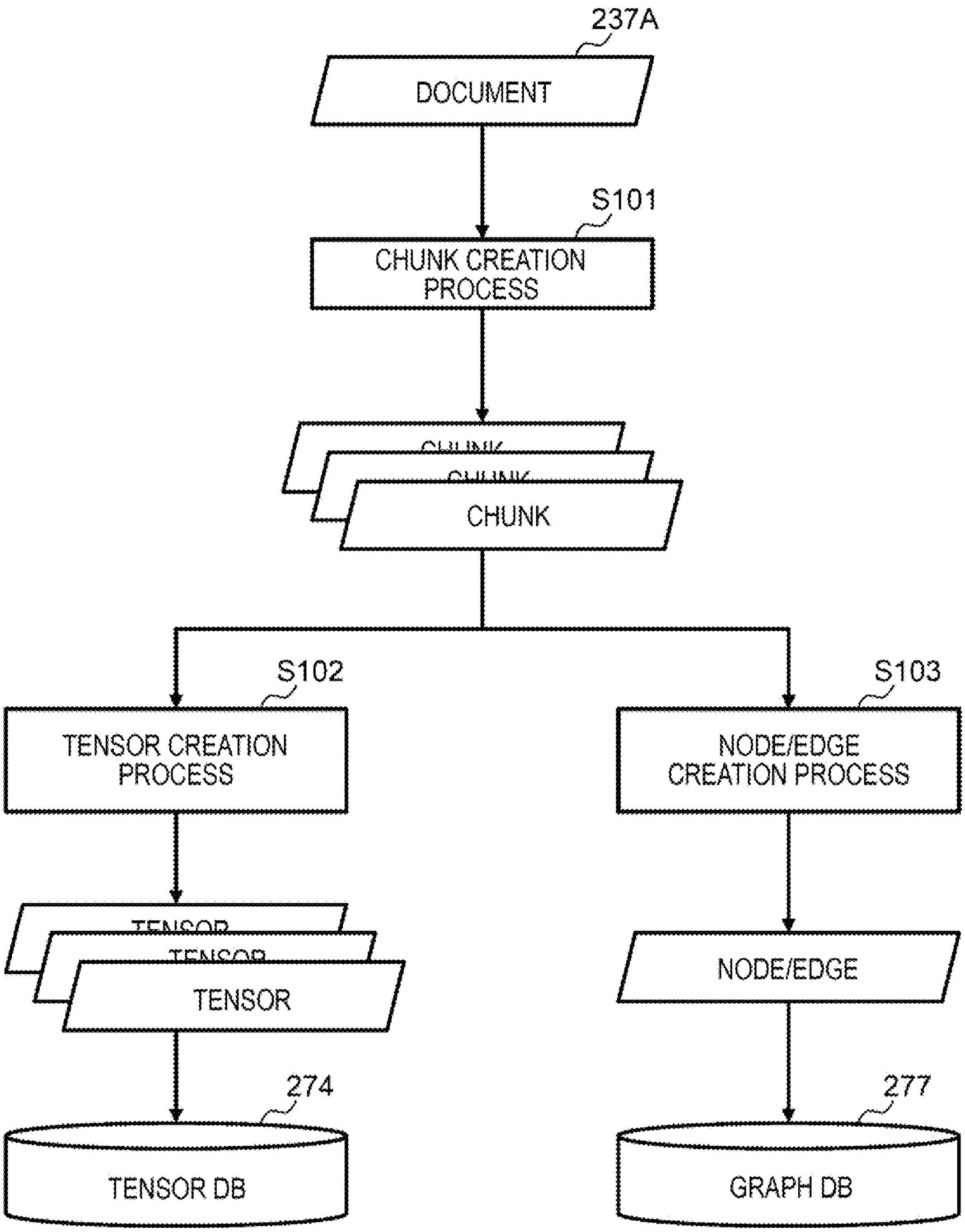
FIG. 16 is a flowchart showing an example of procedures for a document process.

FIG. 16 is a flowchart showing an example of procedures for the document process. In the flowchart shown in FIG. 16, similar to the flowchart shown in FIG. 17, which will be described later, instead of showing only the procedures, the objects respectively related to procedures are also shown. The objects referred to here are, for example, documents, chunks, tensors, nodes, and edges.

In step S101, the processor 3 of the server system 27 executes a chunk creation process. In the chunk creation process, the processor 3 analyzes input document 237A, extracts entities that contain at least one word contained in the document 237A, and obtains a plurality of entities that configure the document 237A. Hereinafter, the extracted entities are referred to as "chunks".

Next, in step S102, the processor 3 executes a tensor creation process. In the tensor creation process, the processor 3 extracts tensors from the plurality of chunks created, generates tensor embeddings using the extracted tensors, and stores the tensor embeddings in the tensor DB 274.

In step S103, for example, in parallel with step S102 described above, the processor 3 of the server system 27 executes a node edge creation process. In the node edge creation process, the processor creates nodes and edges from the chunks created as described above. Here, a node represents an entity. An edge represents a relationship between a plurality of nodes. The processor 3 stores the nodes and edges created for the document 237A in the graph DB 277 as the graph 277A. In other words, the graph DB 277 includes all nodes and edges related to the document 237A.

Figure 17:
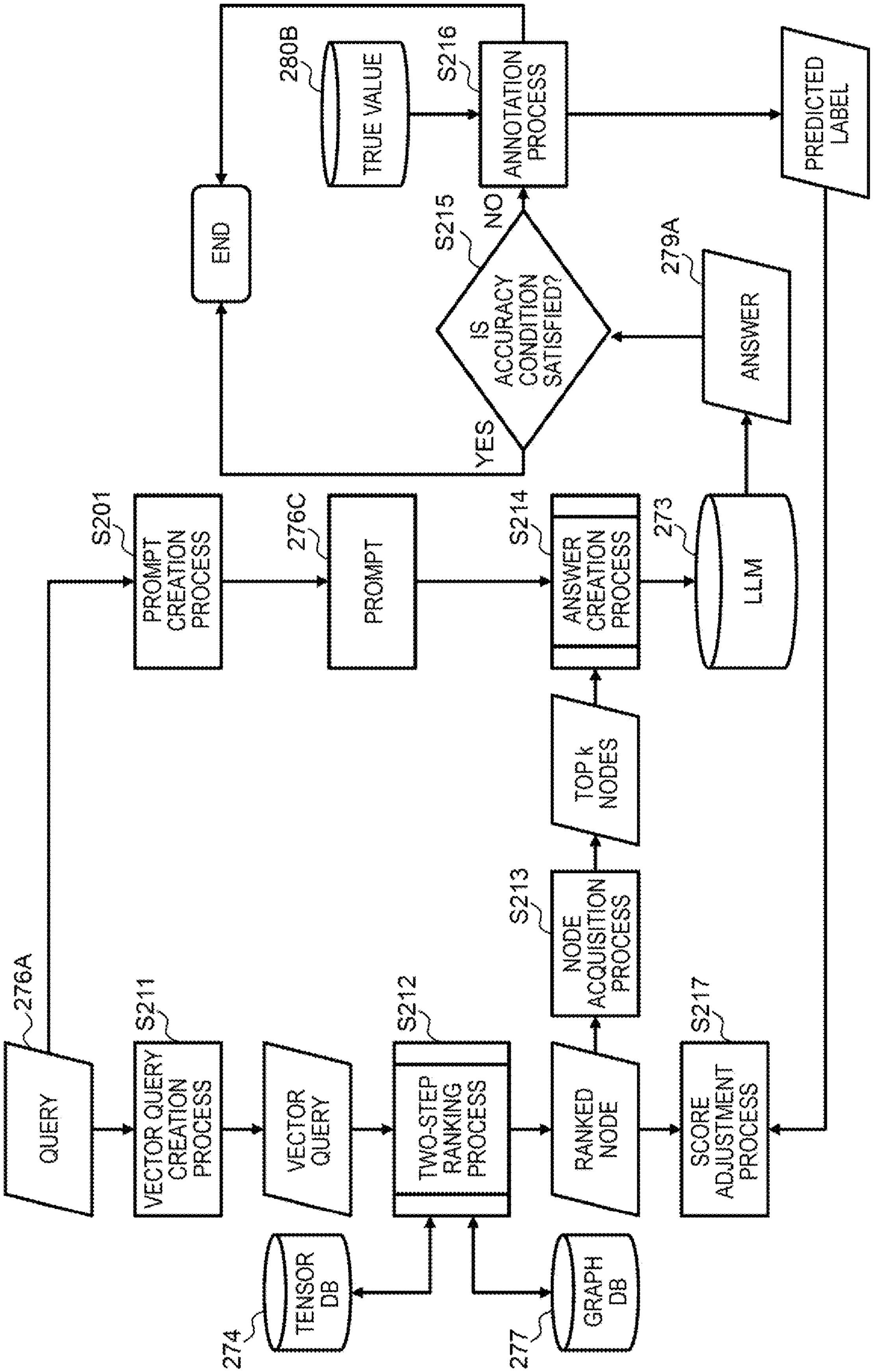
FIG. 17 is a flowchart showing an example of procedures for an answer process.
Figure 18:
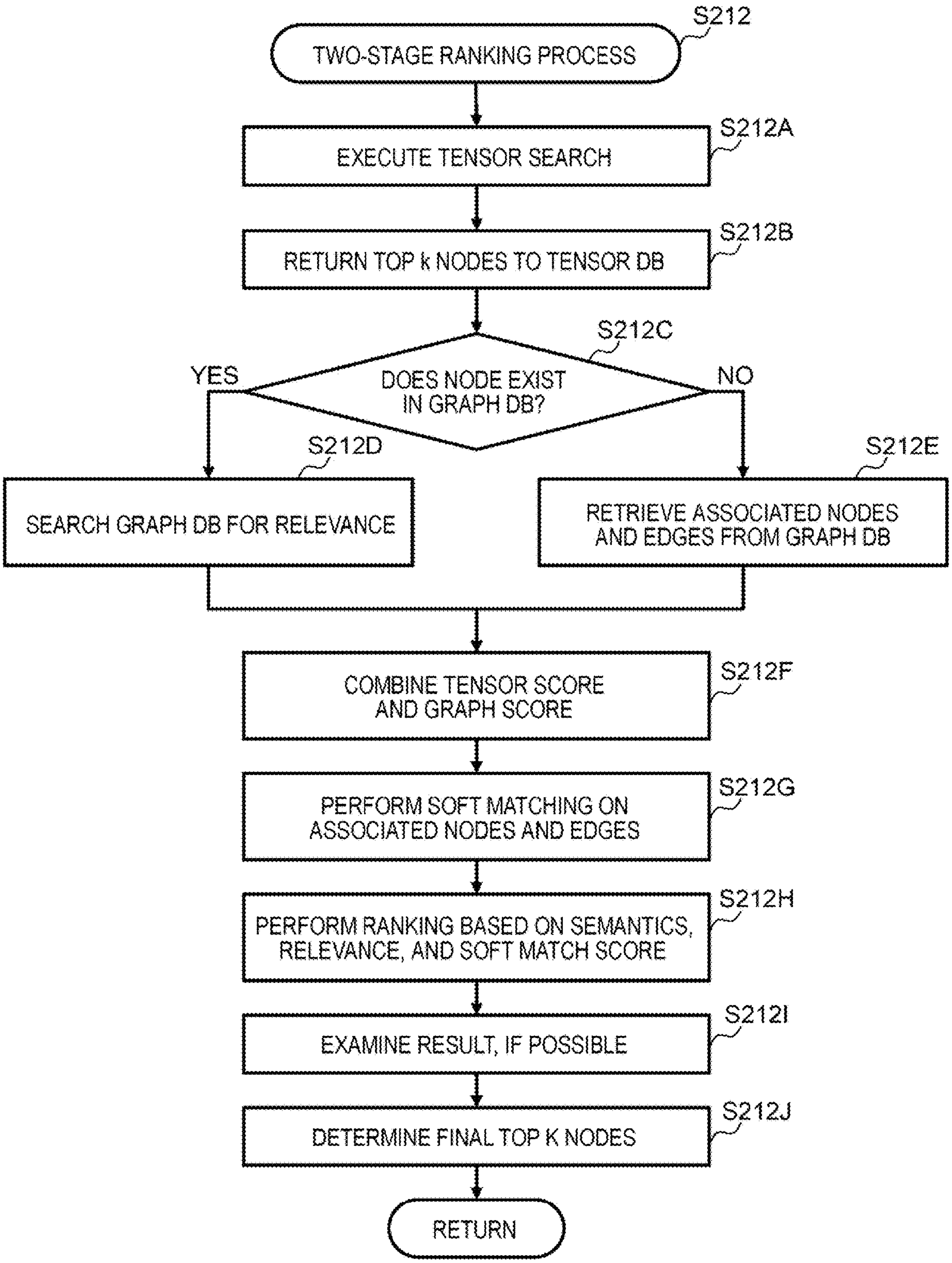
FIG. 18 is a flowchart showing an example of specific procedures for a two-stage ranking process shown in FIG. 17.
Figure 19:
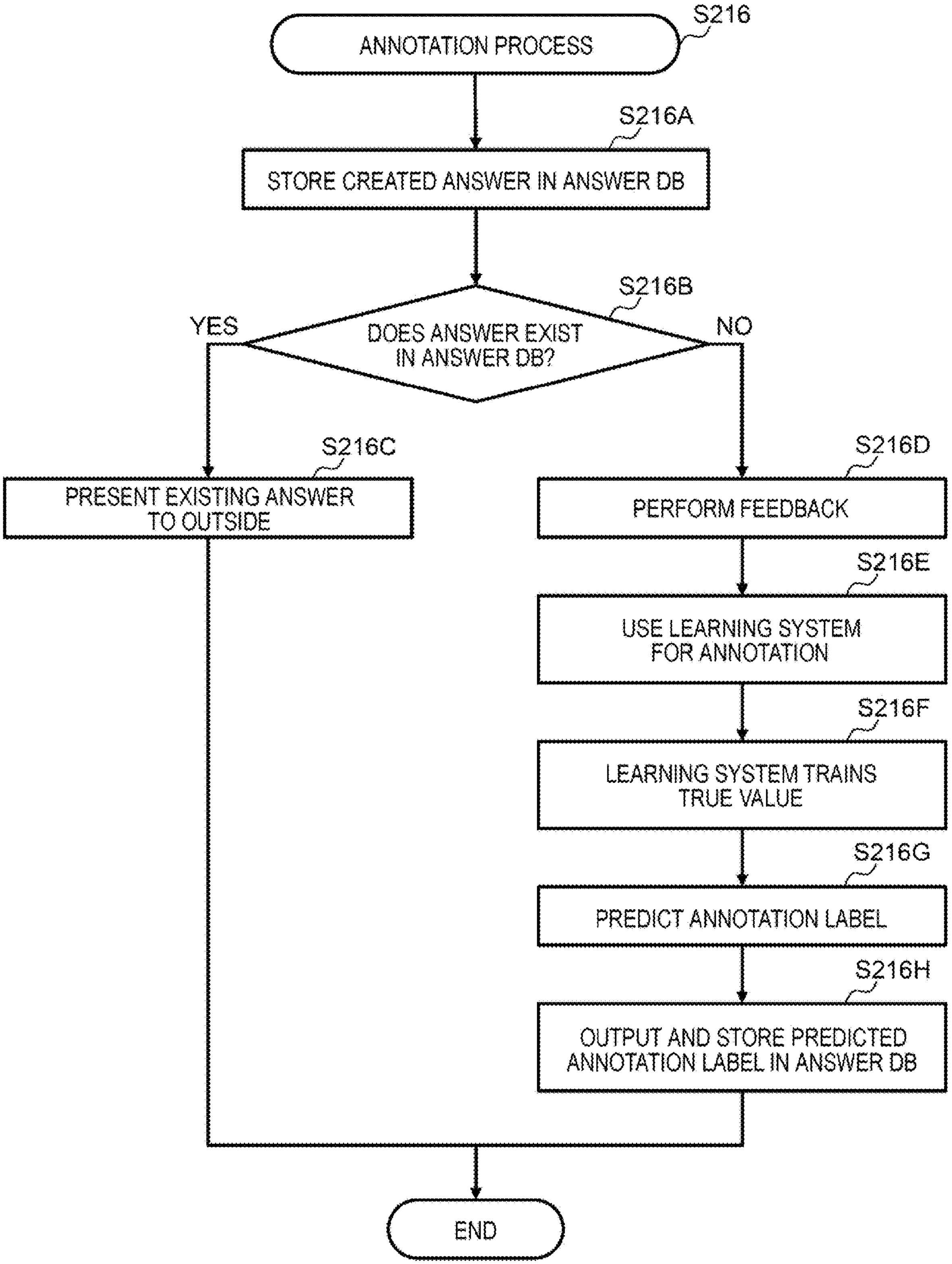
FIG. 19 is a flowchart showing an example of specific procedures for an annotation process shown in FIG. 17.
Figure 20:
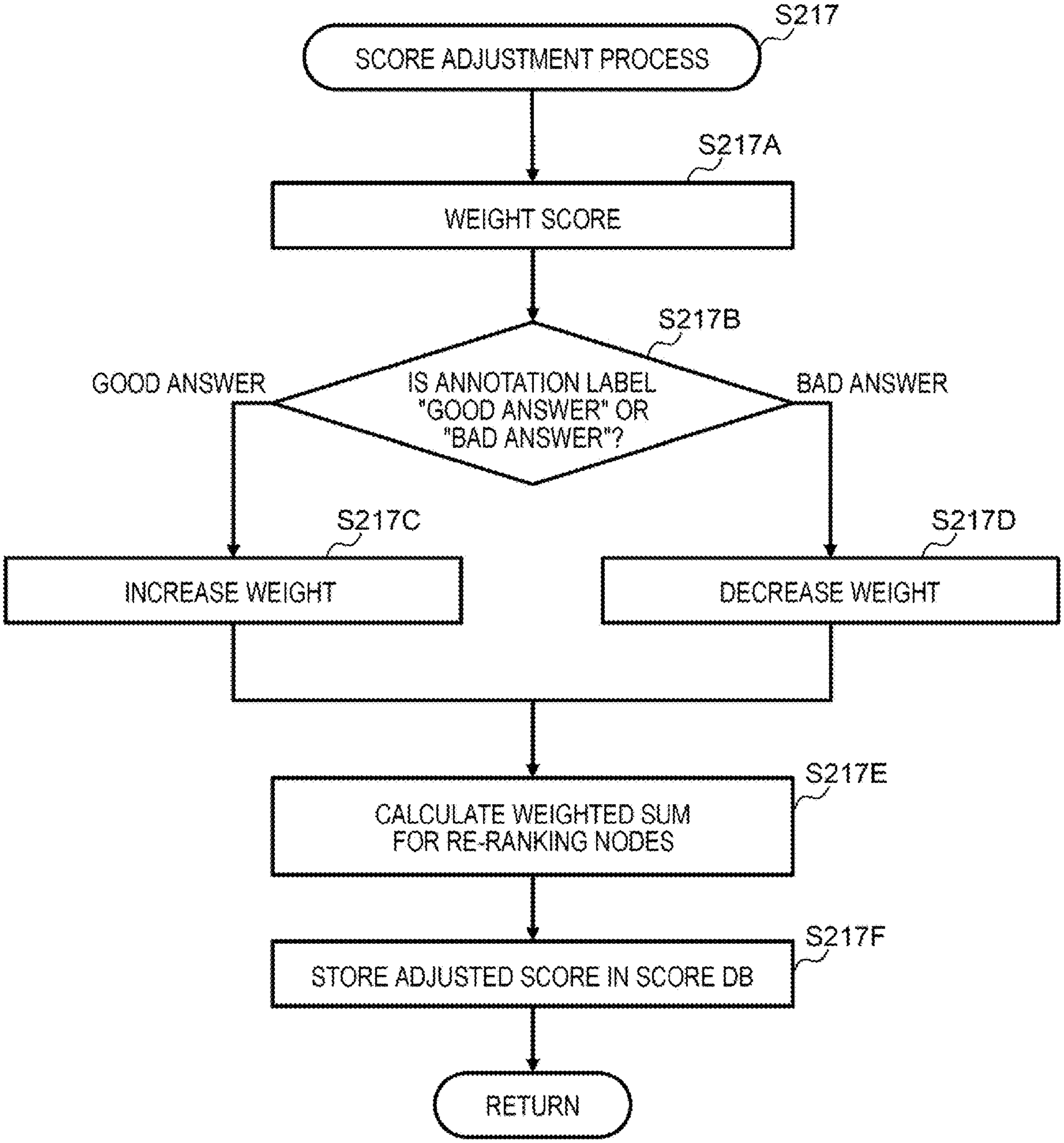
FIG. 20 is a flowchart showing an example of specific procedures for the annotation process shown in FIG. 17.

FIG. 17 is a flowchart showing an example of procedures for the answer process. The flowchart shown in FIG. 17 is executed following the flowchart shown in FIG. 16. FIG. 18 is a flowchart showing an example of specific procedures for a two-stage ranking process shown in FIG. 17. FIG. 19 is a flowchart showing an example of specific procedures for an annotation process shown in FIG. 17. FIG. 20 is a flowchart showing an example of specific procedures for the annotation process shown in FIG. 17. In the flowchart shown in FIG. 17, similar to the flowchart shown in FIG. 16 described above, instead of showing only the procedures, the objects respectively related to procedures are also shown. The objects referred to here are, for example, a query, a vector query, a ranked node, top k nodes (k is a natural number), an answer, and a predicted label.

In step S211 shown in FIG. 17, when the processor 3 of the server system 27 receives the query 276A, the processor executes a vector query creation process in accordance with the query DB 276. In the vector query creation process, the processor 3 inputs the query DB 276 into the embedded model and causes the embedded model to generate a vector query.

In step S212, the processor 3 executes a two-stage ranking process. In the two-stage ranking process shown in FIG. 18, the processor 3 executes a tensor search (step S212A). The tensor search refers to searching for tensors for the nodes and edges that configure the document 237A by referring to the tensor DB 274. In step S212B, the processor 3 returns the top K nodes to the tensor DB 274.

In step S212C, the processor 3 checks whether the node exists in the graph DB 277. When the node exists in the graph DB 277, the processor 3 executes step S212D. In step S212D, the processor 3 searches the graph DB 277 for relationship, i.e., a graph.

On the other hand, when the node does not exist in the graph DB 277, the processor 3 executes step S212E. In step S212E, the processor 3 obtains related nodes and edges from the graph DB 277.

Next, in step S212F, the processor 3 combines the tensor score and graph score to obtain a composite score (see also FIG. 10 and its description). In step S212G, the processor 3 performs soft matching on the related nodes and edges using the following formula, and calculates the soft matching score SoftMatch(q, d).

$$SoftMatch(q, d) = \max\left(0, \left\{1 - \left(EditDistance(q, d)/\max(len(q), len(d))\right)\right\}\right)$$

where q is a word in the query. d is a word in the document. Len is a function that returns the length of a variable. EditDistance(q, d) is the Levenshtein distance between q and d.

In step S212H, the processor 3 performs ranking based on semantics, relationship, and the soft matching score as a result of soft matching. In step S212I, the processor 3 examines the validity of the ranking result according to a predetermined criterion, if possible. In step S212J, the processor 3 determines the final top k nodes (corresponding to the "ranked nodes" shown in FIG. 17).

Next, the processor 3 executes the top node acquisition process shown in FIG. 17 (step S213). In the top node acquisition process, the processor 3 obtains the top k nodes determined as described above. The processor 3 executes a prompt creation process. In the prompt creation process, the processor 3 creates a prompt in response to the query 276A.

Next, the processor 3 executes an answer creation process (step S214). In the answer creation process, the processor 3 inputs the prompt and the top k nodes and edges to the LLM 273 and causes the LLM 273 to create an answer.

Next, processor 3 determines whether the answer satisfies the accuracy condition. When the answer satisfies the accuracy condition, the processor 3 ends the series of processes, whereas when the answer does not satisfy the accuracy condition, the processor 3 executes the following annotation process (step S216).

In this annotation process, as shown in FIG. 19, the processor 3 stores the created answer in the answer DB 279 (step S216A). In step S216B, the processor 3 checks whether the answer exists in the answer DB 279. When the answer exists in the answer DB 279, the processor 3 executes step S214C. In step S216C, the processor 3 presents the existing answer to the outside.

On the other hand, when the answer does not exist in the answer DB 279, the processor 3 executes step S216D. In step S216D, feedback is performed. In step S216E, the processor 3 uses, for example, a predetermined learning system for annotation.

In step S216F, the processor 3 trains the learning system with the true values 20B. Specifically, the processor 3 extracts features of the true values 20B to generate a feature vector. The feature vector is combined with the annotation labels to form a training dataset. The labeled feature vector is divided into a training dataset and a validation set. These are used to train a Support Vector Machine (SVM) model to verify the performance of the SVM model. When the performance of the SVM model satisfies the predetermined conditions, a final SVM model is generated and used. On the other hand, when the performance of the SVM model does not satisfy the predetermined conditions, the learning process is repeated with the system parameters adjusted.

The SVM model maps the input features to a high-dimensional space using a kernel function K(x, y), for example, as in the following formula:

$$f(x) = \{\alpha_1 * y_1 * K(x, x_1) + b\} + \{\alpha_2 * y_2 * K(x, x_2) + b\} + \ldots + (\alpha_i * y_i * K(x, x_i) + b\}$$

where i is a natural number. $\alpha_i$ is the learned weight, $y_i$ is the class label, $x_i$ is the support vector, and b is the bias term.

In step S216G, the processor 3 predicts the annotation label. In step S216H, the processor 3 outputs the predicted annotation label and stores it in the answer DB 279.

When the annotation process (step S216) is ended, processor 3 executes the score adjustment process shown in FIG. 17 as necessary. In the score adjustment process, the processor 3 weights the score as described above, as shown in FIG. 20 (step S217A). For description of such weighting of scores, the description with reference to FIG. 12 above will be referred to.

In step S217B, the processor 3 determines whether the annotation label is a "good answer" or a "bad answer". When it is determined that the annotation label is a "good answer", the processor 3 executes step S217C. In step S217C, the processor 3 changes the weight to increase. On the other hand, when it is determined that the annotation label is a "bad answer", the processor 3 executes step S217D. In step S217D, the processor 3 changes the weight to decrease.

In step S217E, the processor 3 calculates a weighted sum for re-ranking the nodes using the following formula:

$$\text{Adjusted score} = \text{original score} + (\text{weight adjustment} \times \text{label coefficient})$$

Here, weight adjustment is a configurable system parameter stored in the system parameter DB 275. The label coefficient is determined based on the feedback label. The label coefficient is, for example, +1 for positive feedback and −1 for negative feedback. In step S217F, the processor 3 stores the adjusted score in the score DB 278.

Figure 21:
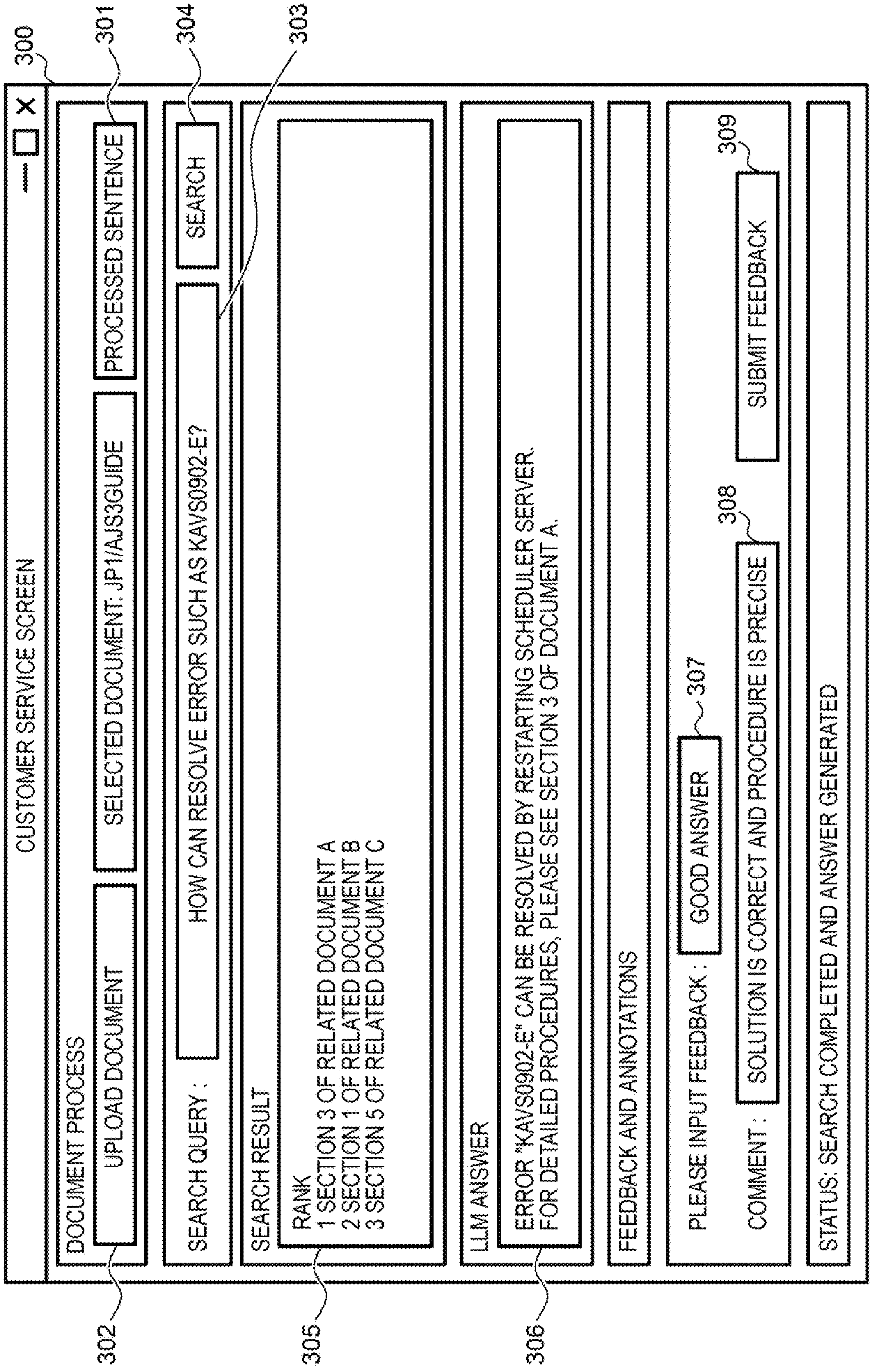
FIG. 21 is a diagram showing an example of a customer service screen.

FIG. 21 is a diagram showing an example of a customer service screen. The customer service screen is an example of a screen that the processor 3 of the server system 27 displays on a display via the output interface 6.

The customer service screen has a processing text input field 301, an upload button 302, a query input field 303, a search button 304, a search result display field 305, an LLM answer display field 306, a feedback input field 307, a comment input field 308, and a submit button 309.

The processing text input field 301 is a file selection field for designating the document to be processed. The upload button 302 is a button for causing the processor 3 to upload the document designated in the processing text input field 301 to the document DB 273.

The query input field 303 is an input field for inputting a query desired by the user (corresponding to the above-mentioned query 276A). The search button 304 is a button for causing the processor 3 to execute each of the above-mentioned search processes using the query input in the query input field 303.

The search result display field 305 is a display field for causing the processor 3 to display the search results using the query. The LLM answer display field 306 is a display field for causing the processor 3 to display the answer created from the LLM 273.

The feedback input field 307 is an input field for inputting feedback on the created answer. The feedback input field 307 is in the form of a drop-down list that allows the selection of, for example, "good answer" or "bad answer". The feedback input field 307 may be configured to allow feedback to be input by, for example, Artificial Intelligence (AI).

The comment input field 308 is an input field for inputting a comment on the created answer. The submit button 309 is a button for submitting the feedback input in the feedback input field 307 and the comment input in the comment input field 308.

With such a customer service screen, it is possible to input desired contents into each input field and register it in the server system 27, or to refer to the contents of each display field.

The server system 27 of the present embodiment is a response system including a processor 3 that executes a predetermined document process on an input document, executes an information search process on a result of the document process, and responds according to a result of the information search process. In the server system 27, the processor 3 analyzes the document received as input and divides the document into chunks, which are smaller sections. The processor 3 generates a tensor embedding from each chunk, and identifies from contents of the document a relationship between at least one node corresponding to the chunk and edges representing relationships between the nodes. The processor 3 stores the tensor embeddings in the tensor DB 274, which is an example of a tensor database, and stores the relationship (corresponding to a graph) between nodes and edges in the graph DB 277, which is an example of a graph database. The processor 3 generates a corresponding vector query using a model of the tensor embeddings in response to a query received from outside, thereby executes a two-stage ranking process.

Furthermore, the processor 3 performs tensor search to understand the semantic of the tensor embeddings based on a predetermined similarity and to obtain top k (k is a natural number) nodes and edges from the tensor DB 274 based on the vector query, and graph search to search the graph DB 277 to check the relationships between the obtained edges and nodes and other entities and to obtain a context from the relationships. The processor 3 combines the result of the tensor search and the result of the graph search by calculating a composite score based on the tensor scores indicating the semantics of the top k (k is a natural number) nodes and edges obtained from the tensor DB 274 and the graph scores indicating the relationships obtained from the graph DB 277, creates a prompt from the top k nodes, and generates an answer using the LLM 273 as an example of a large-scale language model in response to the prompt.

In this way, the processor 3 generates the answers by calculating the composite score based on the tensor scores of the top k (k is a natural number) nodes and edges obtained from the tensor DB 274 and the graph score obtained from the graph DB 277, so that the accuracy of the answers can be improved using the composite score that reflects the results of the tensor search and the graph search.

The processor 3 determines whether the answer generated using the LLM 273 satisfies a predetermined metric, and when the metric is not satisfied, the processor 3 collects feedback on the answer. In this way, the accuracy of the answer can be improved by objective feedback using such quantitative metrics.

The processor 3 uses a predetermined learning system to predict annotation labels for the answers generated using the LLM 273, and the annotation labels are selected from a predefined set of annotation labels (e.g., "good answer", "bad answer"). In this way, the accuracy of the answers can be further improved using the predicted annotation labels selected from the set of the predefined annotation labels.

The processor 3 adjusts the ranking of the nodes and edges by applying weights to the scores that increases if the answer is good and decreases if the answer is bad, based on the predicted annotation labels. In this way, future tensor searches and graph searches are improved by using the adjusted scores using the weighting, thereby improving the accuracy of generating answers to be created in response to future queries.

When generating each chunk from the document, the processor 3 uses named entity recognition (NER) and pattern matching techniques to identify a plurality of entities from each chunk, which is a section of the document, generates nodes and edges representing relationships between the identified plurality of entities, and stores the nodes and edges in the graph DB 277. In this way, answers are generated using structured queries, so the accuracy of answers can be improved.

In response to the query, the processor 3 searches the tensor DB 274 for tensor embeddings, identifies related nodes by analyzing relationships between the retrieved tensor embeddings and other entities stored in the graph DB 277, combines the relationship with the context from the graph DB 277, and again adjusts the composite score. When the score is adjusted in this way, future queries can be created more accurately, for example, correct answers that can efficiently solve complex troubleshooting issues can be provided, while minimizing the risk of presenting incorrect or irrelevant information.

The processor 3 uses a learning system for annotating the answers generated using the LLM 273 to perform training with true values including past answers generated using the LLM 273, predetermined feedback, or annotation labels assigned to classify the quality of answers. In this way, training is performed using true values, so the accuracy of answers can be improved.

The processor 3 reflects the adjusted composite score in queries that will be generated in the future. As described above, the adjusted composite score is reflected in queries to be generated in the future, so the accuracy of answers can be improved.

The processor 3 uses nodes or edges that have been previously labeled as good answers as annotation labels with a higher priority in tensor searches and graph searches that are subsequently performed, while using nodes or edges that have been labeled as bad answers as annotation labels with a lower priority in tensor searches and graph searches that are subsequently performed. By controlling the priority in this way, the accuracy of the answer can be improved.

The processor 3 calculates weights used for re-ranking using the following equation.

$$Sfinal = Soriginal + (Wlabel \times \text{adjustment coefficient})$$

Sfinal: final adjusted search score

Soriginal: original score

Wlabel: weight assigned based on annotation label ("good answer" or "bad answer")

Adjustment coefficient: coefficient by which weight is increased or decreased depending on predicted label.

In this way, the accuracy of answers can be improved using weights quantitatively calculated using the above formula.

The processor 3 executes a generation process for generating tensor embeddings and a generation process for generating nodes and edges in parallel. In this way, both generation processes can be executed simultaneously, and the overall system can be accelerated.

The processor 3 processes data input in Japanese as the document. In this way, the accuracy of answers in Japanese can be improved.

The processor 3 uses as a predetermined metric for evaluating answers generated using LLM 273, for example, at least one of a mean mutual rank (MMR), a hit rate, a faithfulness, validity of the answer, contextual usability, and a comprehensive quality score (CQS) calculated as a weighted sum of two or more of these metrics. In this way, the quality of the answers can be further improved.

The processor 3 uses a forgetting mechanism where importance of past feedback decays exponentially over time. In this way, more accurate answers can be provided.

Note that the present invention is not limited to the above-described embodiment, and includes various modifications and equivalent configurations within the spirit of the appended claims. For example, the above-described embodiment has been described in detail to clearly describe the present invention, and the present invention is not necessarily limited to having all of the configurations described. Furthermore, elements described in parallel in the present embodiment may be in a form in which at least one of the elements is connected in series to the other elements.

INDUSTRIAL APPLICABILITY

The present invention can be applied to a response system related to a technology for answering to customers using a computer.

What is claimed is:

1. A response system comprising:

a processor that executes a predetermined document process on an input document, executes an information search process on a result of the predetermined document process, and responds according to a result of the information search process, wherein the processor analyzes the document received as input, divides the document into chunks that are smaller sections, generates a tensor embedding from each of the chunks, and identifies from contents of the document, a relationship between at least one node corresponding to the chunk and edges representing relationships between the nodes, stores the tensor embeddings in a tensor database and stores the relationships between the nodes and the edges in a graph database, and generates a corresponding vector query using a model of the tensor embeddings in response to a query received from outside, thereby executing a two-stage ranking process, and further, the processor executes tensor search to understand semantic of the tensor embeddings based on a predetermined similarity and obtain top k (k is a natural number) nodes and edges from the tensor database, based on the vector query, and graph search to search the graph database to check relationships between the obtained edges and nodes and other entities and obtain a context from the relationships, and combines a result of the tensor search and a result of the graph search by calculating a composite score based on tensor scores indicating semantics of the top k nodes and edges obtained from the tensor database and graph scores indicating the relationships obtained from the graph database, creates a prompt from the top k nodes, and generates an answer using a large-scale language model in response to the prompt.

2. The response system according to claim 1, wherein the processor determines whether the answer generated using the large-scale language model satisfies a predetermined metric, and collects feedback on the answer, when the metric is not satisfied.

3. The response system according to claim 1, wherein the processor uses a predetermined learning system to predict an annotation label for the answer generated using the large-scale language model, and the annotation label is selected from a set of predefined annotation labels.

4. The response system according to claim 1, wherein the processor adjusts rankings of the nodes and edges, by applying a weight to a score that increases if the annotation label is a good answer and decreases if the annotation label is a bad answer, based on the predicted annotation label.

5. The response system according to claim 1, wherein the processor when generating each of the chunks from the document, identifies a plurality of entities from each chunk, which is a section of the document, using named entity recognition and pattern matching techniques, and generates the nodes and edges representing relationships between the plurality of identified entities and stores the generated nodes and edges in the graph database.

6. The response system according to claim 1, wherein the processor searches the tensor database for the tensor embeddings in response to a query, identifies related nodes by analyzing relationships between the retrieved tensor embeddings and other entities stored in the graph database, and combines the relationship with the context from the graph database and again adjusts the composite score.

7. The response system according to claim 6, wherein the processor reflects the adjusted composite score in queries to be generated in future.

8. The response system according to claim 7, wherein the processor uses nodes or edges that have been previously labeled as good answers as the annotation labels, with a higher priority in the tensor search and the graph search that are subsequently performed, and uses nodes or edges labeled as bad answers as the annotation labels, with a lower priority in the tensor search and the graph search that are subsequently performed.

9. The response system according to claim 7, wherein the processor calculates weights used for re-ranking using the following equation:

$$Sfinal = Soriginal + (Wlabel \times \text{adjustment coefficient})$$

Sfinal: final adjusted search score

Soriginal: original score

Wlabel: weight assigned based on annotation label

Adjustment coefficient: coefficient by which weight is increased or decreased depending on predicted label.

10. The response system according to claim 1, wherein the processor uses a learning system for annotating the answers generated using the large-scale language model to perform training with true values including past answers generated using the large-scale language model, predetermined feedback, or annotation labels assigned to classify quality of the answers.

11. The response system according to claim 1, wherein the processor executes a generation process for generating the tensor embeddings and a generation process for generating the nodes and edges in parallel.

12. The response system according to claim 1, wherein the processor processes data input in Japanese as the document.

13. The response system according to claim 1, wherein the processor uses as a predetermined metric for evaluating answers generated using the large-scale language model, for example, at least one of a mean mutual rank, a hit rate, a faithfulness, validity of the answer, contextual availability, and a comprehensive quality score calculated as a weighted sum of two or more of these metrics.

14. The response system according to claim 1, wherein the processor further uses a forgetting mechanism where importance of past feedback decays exponentially over time.

15. A response method for a response system including a processor that executes a predetermined document process on an input document, executes an information search process on a result of the predetermined document process, and responds according to a result of the information search process, wherein the processor analyzes the document received as input, divides the document into chunks that are smaller sections, generates a tensor embedding from each of the chunks, and identifies from contents of the document, a relationship between at least one node corresponding to the chunk and edges representing relationships between the nodes, stores the tensor embeddings in a tensor database and stores the relationships between the nodes and the edges in a graph database, and generates a corresponding vector query using a model of the tensor embeddings in response to a query received from outside, thereby executing a two-stage ranking process, and further, the processor executes tensor search to understand semantic of the tensor embeddings based on a predetermined similarity and obtain top k (k is a natural number) nodes and edges from the tensor database, based on the vector query, and graph search to search the graph database to check relationships between the obtained edges and nodes and other entities and obtain a context from the relationships, and combines a result of the tensor search and a result of the graph search by calculating a composite score based on tensor scores indicating semantics of the top k nodes and edges obtained from the tensor database and graph scores indicating the relationships obtained from the graph database, creates a prompt from the top k nodes, and generates an answer using a large-scale language model in response to the prompt.

* * * * *